S. B. DAVIS.
SEED DROPPER.
No. 175,673. Patented April 4, 1876.
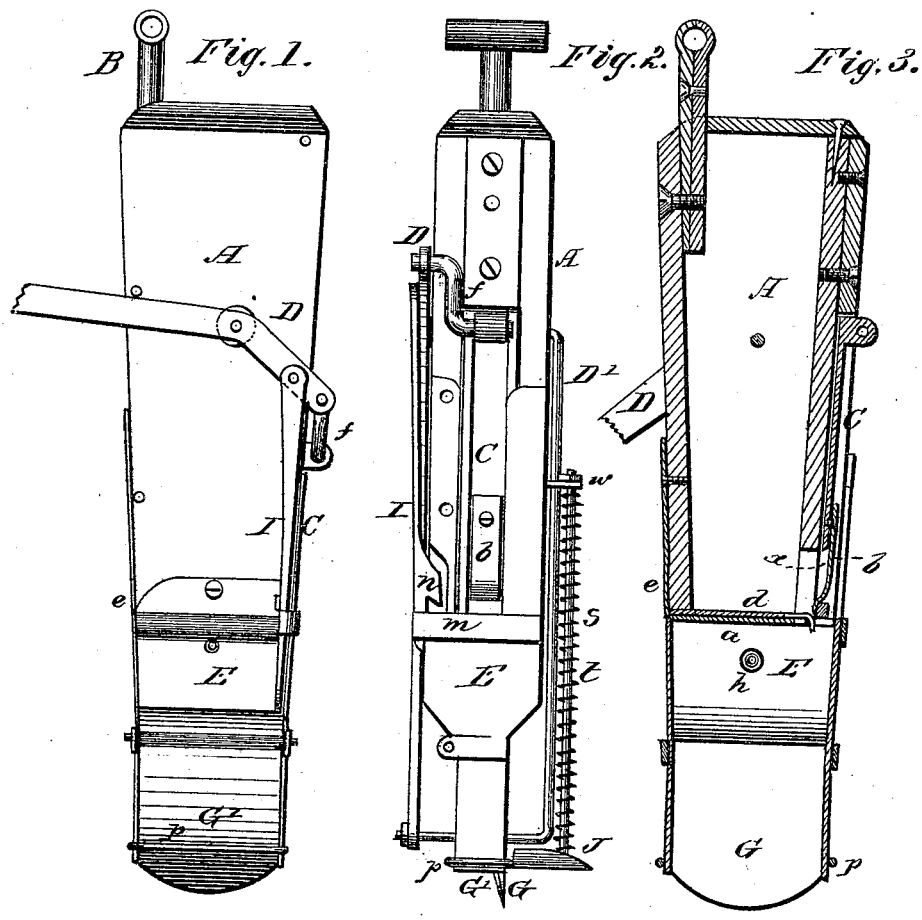
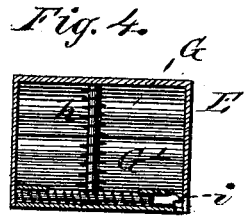
WITNESSES:
INVENTOR:
S. B. Davis.
T. H. Alexander
Attorney.

UNITED STATES PATENT OFFICE.

SAMUEL B. DAVIS, OF HAMBURG, IOWA.

IMPROVEMENT IN SEED-DROPPERS.

Specification forming part of Letters Patent No. 175,673, dated April 4, 1876; application filed January 13, 1876.

*To all whom it may concern:*

Be it known that I, SAMUEL B. DAVIS, of Hamburg, in the county of Tremont and State of Iowa, have invented certain new and useful Improvements in Seed-Droppers; and I do hereby declare that the following is a full, clear, and exact description thereof, reference being had to the accompanying drawings, and to the letters of reference marked thereon, which form part of this specification:

The nature of my invention consists in the construction and arrangement of a hand seed-sower, as will be hereinafter more fully set forth.

In order to enable others skilled in the art to which my invention appertains to make and use the same, I will now proceed to describe its construction and operation, referring to the annexed drawing, in which—

Figure 1 is a side elevation, Fig. 2 an end elevation, Fig. 3 a central vertical section, Fig. 4 a cross-section, and Fig. 5 a detail view, of my invention.

A represents the seed-box, provided with a suitable lid on top, and a T-shaped casting or handle B, for attaching straps or their equivalents to suspend the planter in any convenient position to the person operating the same.

The seed-box A is provided with a bottom, $a$, through a slot at one end of which passes the dropping-slide C. This slide has a recess, $x$, on its inner side, to receive the seed from the box A and carry it down to the chamber E underneath. The recess $x$ in the seed-slide is enlarged or diminished by means of a slide, $b$, therein, so as to drop more or less seed, as required. Against the inner side of the slide C, immediately above the bottom $a$, works a flanged plate, $d$, held against the same by means of a spring, $e$, on the outside of the box, which plate yields to prevent the breaking of any seed or clogging of the slide.

The upper end of the slide C is by a crank, $f$, connected to one end of a lever, D, pivoted on the side of the box, and to the other end of which is connected a handle, D', pivoted to the opposite side of the box. The chamber E is formed of metal attached to the lower end of the box A and formed at its bottom end with a flat projecting mouth, G. One side, G', of the chamber and mouth is made loose and pivoted at or near its center with a spring, $h$, acting from the interior of the chamber upon its upper end to close the lower end of the mouth and retain the seed dropped into the chamber by the seed-slide. In the upper end of the pivoted side G' is a spring-bolt, $i$, having its outer end beveled on one side, as shown. To the lever D is pivoted an arm, I, which passes through a guide, $m$, on one side of the chamber, and has on its inner side a grooved cam-projection, $n$, to operate on the spring-bolt $i$.

After the slide C has been moved downward and deposited the seed in the chamber E, it is moved upward again, and during this movement the cam $n$ rides over the end of the spring-bolt $i$, turning the side G' on its pivot so as to open the mouth and allow the seed in the chamber to fall into the ground. As the slide completes its upward movement, the cam clears the bolt and the spring $h$ throws the side G' to its original position. As the slide is then moved down again, the cam, by its reduced thickness at the end of the groove, causes the bolt $i$ to be pressed inward, its beveled end riding in said groove so that the side G' remains in its position, and when the cam has cleared it the bolt springs out again, ready to be acted upon by the cam at its upward movement.

J is a projecting foot, held around the mouth G by a bail, $p$, and provided with a rod, $t$, passing upward through a lug, $w$, on the side of the machine, and the rod surrounded by a spiral spring, $s$, so that when the mouth G is pressed into the ground the foot J yields, and in taking the machine out of the ground the spring-foot not only aids in bringing it out of the ground, but it and the bail $p$ clear the mouth from all adhering dirt.

Having thus fully described my invention, what I claim as new, and desire to secure by Letters Patent, is—

1. The combination of the box A, with horizontal bottom $a$, slide C, with recess $x$ and slide *b*, flanged plate *d* and spring *e*, substantially as and for the purposes herein set forth.

2. The combination of the chamber E with mouth G, and the pivoted side G′ with spring *h*, as and for the purposes herein set forth.

In testimony that I claim the foregoing as my own, I affix my signature in the presence of two witnesses.

SAMUEL B. DAVIS.

Witnesses:
 ORIN DARLING,
 J. R. HATTEN.